United States Patent [19]

Singh et al.

[11] Patent Number: 5,298,539
[45] Date of Patent: Mar. 29, 1994

[54] ADDITIVES FOR IMPROVING TIRE CORD ADHESION AND TOUGHNESS OF VULCANIZED RUBBER COMPOSITIONS

[75] Inventors: Balwant Singh; John A. Sedlak, both of Stamford, Conn.

[73] Assignee: Cytec Industries, Inc., Stamford, Conn.

[21] Appl. No.: 578,489

[22] Filed: Sep. 5, 1990

[51] Int. Cl.$^5$ .............................................. C08K 5/34
[52] U.S. Cl. .................................... 524/92; 524/94; 524/100; 524/103; 524/432; 524/435; 524/575.5; 525/158; 525/164; 525/281
[58] Field of Search .................. 524/92, 94, 100, 102, 524/103, 432, 435; 525/158, 164, 281

[56] References Cited

U.S. PATENT DOCUMENTS

| | | | |
|---|---|---|---|
| 3,020,255 | 2/1962 | Magrane | 260/45.3 |
| 4,038,220 | 7/1977 | Thompson | 524/512 |
| 4,230,550 | 10/1980 | Vincent | 204/159 |
| 4,230,740 | 10/1980 | Moyer | 427/54.1 |
| 4,931,536 | 6/1990 | Pfohl | 528/250 |

FOREIGN PATENT DOCUMENTS

| | | | |
|---|---|---|---|
| 366884 | 5/1990 | European Pat. Off. | |
| 57-049606 | 3/1982 | Japan | 525/281 |
| 116628 | 7/1982 | Japan | B29H 9/04 |

*Primary Examiner*—John C. Bleutge
*Assistant Examiner*—Mark D. Sweet
*Attorney, Agent, or Firm*—Bart E. Lerman; Michael J. Kelly; Claire M. Schultz

[57] ABSTRACT

New additives in rubber compositions improve tire cord adhesion without need to use resorcinol. The new additives are derivatives of melamine, aceto guanamine, benzoguanamine, cyclohexylguanamine, and glycoluril, substituted with at least two vinyl-terminated radicals. Preferred compounds may also be substituted with at least one radical having a carbamylmethyl group.

43 Claims, No Drawings

ADDITIVES FOR IMPROVING TIRE CORD ADHESION AND TOUGHNESS OF VULCANIZED RUBBER COMPOSITIONS

The invention relates to rubber compositions having improved rubber toughness and improved adhesion to tire cords and relates to rubber additives for improving rubber toughness and adhesion of rubber to reinforcing cords in vulcanized rubber products. A widely used organic rubber additive for improving adhesion of vulcanized rubber to brass coated steel cords and polyaramid or polyester cords comprises the combination of hexamethoxymethylmelamine and resorcinol. Hexamethylenetetramine is sometimes used in combination with resorcinol. Those combinations of organic compounds are quite effective for the purpose but the use of resorcinol presents malodorous and possibly toxic hazards during processing due to excessive fuming of resorcinol during rubber processing.

Japanese Patent Publication 57/116628 published Jul. 20, 1982 described rubber compositions containing derivatives of melamine substituted with 1 to four vinyl terminated radicals and also containing resorcinol or other equivalent compound. On curing there was a reaction of resorcinol and the melamine derivative. Chem. Abst. 97 (26): 217764q; Derwent Accession No. 82-71461E/34(71461E). Rubber compositions of the present invention are made without resorcinol or its equivalent and the cured resins are not those obtained by reaction with resorcinol.

One object of the invention is to provide a class of compounds for use as additives in rubber compositions for improving rubber toughness and adhesion to reinforcing cords in vulcanized rubber products and which can be used in vulcanizable rubber formulations to improve rubber toughness and tire cord adhesion without the need to use resorcinol in such formulations.

Compounds useful as rubber additives in accordance with the invention are substituted derivatives based on the cyclic nitrogen compounds melamine, acetoguanamine, cyclohexylguanamine, benzoguanamine and similar alkyl, aryl or aralkyl substituted melamines, glycoluril and oligomers of those compounds. Oligomers are polymers having up to about 10 polymerized units of those cyclic compounds, such as those obtained by condensation of melamine with formaldehyde, for example. The invention uses derivatives of those compounds and oligomers of those compounds which have been substituted at two or more reactive hydrogen positions on the monomer, or an average of two or more positions on each polymerized unit of the oligomerized cyclic nitrogen compound, with vinyl-terminated radicals. Preferably the compound is further substituted at one or more active hydrogen positions on the monomer, or an average of one or more positions on each unit of the oligomer, with a radical having a carbamylmethyl group. The substituted derivatives may also comprise unreacted active hydrogen atoms or hydroxymethyl, alkoxymethyl, alkylamide or arylamide radicals on the basic unit when all of the active positions are not occupied by radicals having carbamyl or vinyl terminated groups.

Melamine based derivatives useful as rubber additives in accordance with the invention include compounds having the formula

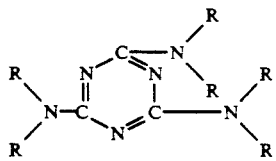

wherein, on average
at least two R are $-CH_2-R^1$
and any remaining R are H
at least 2 $R^1$ are radicals selected from $CH_2=C(R^2)-C(O)-O-$, $CH_2=C(R^2)-C(O)-Z$ $CH_2=C(R^2)-C(O)-NH-$, and $CH_2=C(R^2)-CH_2-O-$, wherein $R^2$ is hydrogen or $C_1-C_{18}$ alkyl, and Z is a radical selected from $-O-CH_2-CH_2-O-$, $-O-CH_2-CH(CH_3)-O-$, $-O-CH_2-CH_2-CH_2-O-$, $-O-CH(C_2H_5)-O-$, and any remaining $R^1$ radicals are selected from $-O-R^3$, and $-NH-C(O)-OR^4$ $-NH-C(O)-R^4$ wherein
$R_3$ is hydrogen or $R_4$, and
$R_4$ is a $C_1-C_{18}$ alkyl, alicyclic, hydroxyalkyl, alkoxyalkyl or aromatic radical.

Derivatives based on melamine oligomers have the formula

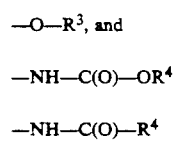

wherein
p is 2 to 10
L is methylene or the radical $-CH_2OCH_2-$
and the R groups in each unit are as defined above.

Derivatives based on benzoguanamine, acetoguanamine, or cyclohexylguanamine which are used in the invention have the formula

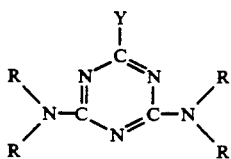

wherein Y is methyl, phenyl, or cyclohexyl and the R groups are as defined above Derivatives based on derivatives of acetoguanamine, benzoguanamine, or cyclohexylguanamine oligomers which are used in the invention have the formula

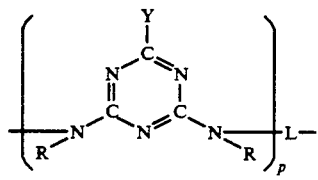

wherein L, P, Y and the R groups in each unit are as defined above.

Glycoluril based derivatives used in the invention have the formula

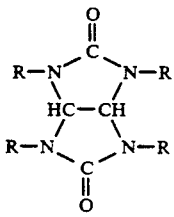

wherein the R groups are as defined above

Glycoluril oligomers based derivatives used in the invention have the formula

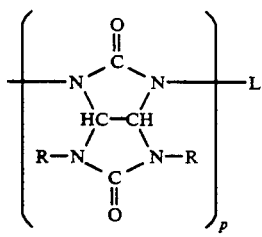

and positional isomers thereof, wherein: p, L and the R groups in each unit are as defined above.

Especially preferred for use in the invention are compounds of the formulas defined above wherein, in addition to the defined vinyl terminated radicals, at least one of the R groups is a carbamylmethyl group of the formula —$CH_2$—NH—C(O)—$OR_4$, wherein $R_4$ is as defined above. Compounds of this especially preferred group and the synthesis of preferred compounds of the group were described in the European Patent Application Publication No. 0 366 884, published May 9, 1990, assigned to American Cyanamid Company.

Derivatives based on melamine and having at least two vinyl-terminated radicals as in the present invention, were described for use in photopolymerizable compositions in U.S. Pat. No. 4,230,740 patented Oct. 28, 1980 to Joseph D. Moyer, and U.S. Pat. No. 4,230,550 patented Oct. 28, 1980 to K. D. Vincent. Those patents also described and referred to known methods for making the substituted derivatives. Both patents referred to U.S. Pat. No. 3,020,255 for description of such methods. The same methods are useful for making vinyl terminated derivatives of the guanamines and glycoluril.

The adhesion promoter additives of the invention are added to vulcanizable rubber compositions in amounts in the range from 0.2 to 10 or even more parts by weight per hundred parts rubber (phr). The principal components of the vulcanizable rubber compositions comprise rubber, which may be natural rubber or synthetic rubber, or a mixture of natural and synthetic rubbers, and a vulcanizing agent such as sulfur. Rubbers such as butadiene-styrene copolymers, polyisoprene, polybutadiene, polychloroprene, nitrile and ethylene propylene copolymers, terpolymer rubbers, acrylo and fluoro elastomers, block copolymer rubbers and the like can be used. Other conventional additives for rubber compositions may be included in rubber compositions of the invention, such as carbon black, silica, zinc oxide, stearic acid, antioxidants, vulcanizing accelerators, and the like. In preferred rubber compositions according to the invention a cobalt salt is also included as a promoter for steel cord adhesion preferably used in proportions from 0.5 to 1.5 phr. A preferred salt of cobalt for the use is a cobalt boron complex containing 23% cobalt (Manobond ® 680C). The additives of the invention can be used in rubber compositions which also comprise hydroxymethylmelamines or alkoxymethylmelamines or the like, but without resorcinol or its equivalent. Equivalents of resorcinol are compounds that can be used instead of resorcinol as methylene acceptors in rubber compositions. Some resorcinol equivalents were described, for example in U.S. Pat. No. 4,605,696 patented Aug. 12, 1986 to D. A. Benko, et. al.

In some embodiments of the invention we use a catalytic amount of a catalyst for vinyl addition reactions with the tire cord adhesion promoters in rubber compositions of the invention. Free radical initiators such as the peroxy, hydroperoxy and azo catalysts are suitable. Hydroperoxy catalysts in catalytic amounts are preferred, and cumene hydroperoxide is an especially preferred catalyst. An amount in the range from 0.1% to 2% by weight of the catalyst, based on the weight of the vinyl terminated additive compound, is a sufficient catalytic amount for the preferred rubber compositions. Upon heating to vulcanize the rubber composition, the vinyl terminated derivatives can polymerize by vinyl addition to make vinyl polymers which contribute to improved tire cord adhesion and rubber toughness in the rubber products. In prior art compositions, the alkoxymethylmelamines or hydroxymethylmelamines in rubber compositions were supposed to polymerize by reaction with resorcinol to improve tire cord adhesion. In the present invention the vinyl derivatives of melamine, the guanamines, glycoluril and their oligomers can polymerize without resorcinol to improve tire cord adhesion in the vulcanized rubber products. The vinyl derivatives may be used to advantage as additives in rubber compositions in combination with other amino additives such as hydroxymethylmelamines or methoxymethylmelamines or the like, without resorcinol or its equivalent.

The additives of the invention can be added into rubber compositions by conventional means and methods for addition of known additives in rubber compositions, such as hydroxymethylmelamines or methoxymethylmelamines for example. A usual method for mixing rubber compounds is by mixing in a Banbury mixer. In one typical method, additives which are not reactive are blended first into the rubber at temperatures up to about 140° C. in the Banbury. Vulcanizing agents accellerator, and adhesion promoters are added in a second mixing step at temperatures from about 90° to 100° C.

The invention will be described in more detail by reference to the following specific examples which include our presently most preferred mode for carrying out the invention.

EXAMPLE 1

A melamine methacrylate carbamate designed to have on average four methacryloyloxypropyloxymethyl groups and two methylcarbamylmethyl groups is obtained by reaction of a hexamethoxymethylmelamine mixture (CYMEL® 300 which contains mostly the monomer with some dimers and lower oligomers of the monomer), with hydroxypropylmethacrylate and then with methyl carbamate. This preparation is described in more detail in Example 5 of the European Patent Application Publication No. 0 366 884, mentioned above.

The product was diluted to make a 50% solution in methylene chloride. Benzoquinone was added to make 200 ppm benzoquinone based on the solids. The solution was then divided into three parts. To the first part was added 1% by wt of cumene hydroperoxide catalyst based on weight of the dissolved solids. The solvent was then removed by rotary vacuum evaporation leaving a viscous liquid product containing 1% catalyst.

EXAMPLE 2

To the second part from the divided sample in Example 1 was added ½ percent by weight cumene hydroperoxide based on weight of the dissolved solids. The solvent was removed as before to make the viscous liquid product containing 0.5% catalyst.

EXAMPLE 3

The third part from the divided sample in Example 1 was dried by evaporation with no added cumene hydroperoxide. The viscous liquid product contained no catalyst.

EXAMPLE 4

A derivative of hexamethoxymethylmelamine designed to have on average four methacryloyloxypropyloxymethyl groups and two propylcarbamylmethyl groups, was prepared as follows.

A three liter flask equipped with motorized stirrer and distillation receiver cooled in dry ice was charged with 156.4 g. of CYMEL®300, 82.4 g of hydroxypropyl methyacrylate (Rocryl®410, Rohm & Haas), and 0.093 g. of benzoquinone. The flask was heated in a 75° C. oil bath for 15 minutes to obtain a clear solution. Then 2.08 g of para-toluenesulfonic acid was added.

The pressure in the reactor was lowered to 50 mm Hg and, during three hours and forty-five minutes, methanol distillate was collected until distillation almost ceased (82% of theoretical methanol). Then the heating bath was cooled to 65° C. and 82.4 g of n-propyl carbamate was added to the flask.

The reaction mixture was stirred at 75° C. at 50 mm Hg for 125 minutes until methanol generation almost ceased and then the reaction was stopped.

The cooled reaction product was dissolved in 250 ml. of methylene chloride and the solution was washed in a separatory funnel with 100 ml of 5% sodium carbonate solution followed by 100 ml. of deionized water. The organic layer was separated and dried over anhydrous potassium carbonate.

The potassium carbonate was removed by filtration and 200 ppm of benzoquinone and 1.0% of cumene hydroperoxide (calculated on product solids) were added. The solvent was evaporated leaving 364 g. of viscous liquid product containing 1% catalyst.

EXAMPLE 5

The derivative of hexamethoxymethylmelamine designed to have on average three methacryloyloxypropyloxymethyl groups was prepared as follows.

The preparative procedure was similar to that in Example 4 except the materials used were 195 g. of CYMEL 300, 209.7 g. of hydroxypropyl methacrylate, 0.081 g. of benzoquinone, and 2.02 g. of para-toluenesulfonic acid. During one hour at 75° C. at 50 mm Hg pressure, 97% of the theoretical amount of methanol distilled.

The product was dissolved in 250 ml. of methylene chloride and washed with one portion of 5% sodium carbonate solution and two portions of water. After drying with potassium carbonate, the solution was treated with 200 ppm of benzoquinone and 1.0% of cumene hydroperoxide (calculated on product solids). Evaporation of the solvent left 331 g. of viscous liquid product containing 1% catalyst.

EXAMPLE 6

A derivative from hexamethoxymethylmelamine designed to have on average four acryloylethoxymethyl groups and two methylcarbamylmethyl groups is prepared by reaction of CYMEL 300 with methyl carbamate and then with 2-hydroxyethyl acrylate as described in Example 4 of the European Patent Application Publication No. 0 366 884, mentioned above. No catalyst is added.

EXAMPLE 7

A derivative of hexamethoxymethylmelamine designed to have on average four acrylamidomethyl groups and two propycarbamylmethyl groups, was prepared as follows.

The preparation is like that described in Example 8 below except the materials used are 195 g. of CYMEL 300, 142 g of crystalline acrylamide, 103 g. of n-propyl carbamate, 1 liter of cyclohexane, 0.088 g. of benzoquinone, and 2.2 g. of para-toluenesulfonic acid.

To the washed product dissolved in methylene chloride is added 200 ppm of benzoquinone and 1.0% of cumene hydroperoxide based on weight of the product solids. Evaporation of the solvent leaves 305 g. of friable solid product containing 1% catalyst.

NMR analysis of the product shows the following percentages of three functional groups (normalized to 100%): 65% —NHCOCH=CH$_2$, 30% —NHCOOC$_3$H$_7$, 5% —OCH$_3$.

EXAMPLE 8

A derivative of hexamethoxymethylmelamine designed to have on average four acrylamidomethyl groups and two methylcarbamylmethyl groups, was prepared as follows.

A two liter flask equipped with motorized stirrer and distillation condenser is charged with 149.8 g. of CYMEL 300, 109.1 g. of crystalline acrylamide, 57.7 g of methyl carbamate, 1 liter of cyclohexane, 1.79 g. of benzoquinone, and 1.54 g. of para-toluenesulfonic acid.

The stirred mixture is heated in a 95° C. oil bath to cause distillation from the reaction mixture. A mixture of cyclohexane and methanol distillate is collected during 3¾ hours until the theoretical amount of methanol (94 ml.) has distilled and then the reaction is stopped by cooling to room temperature.

The cyclohexane is decanted to obtain a solid which is then dissolved in 700 ml. of methylene chloride to give a clear yellow solution. The solution is washed with one portion of 5% sodium carbonate solution in water and two portions of deionized water. The solution is then dried by standing over anhydrous granular potassium carbonate. To this solution are added 200 ppm of benzoquinone and 1.0% of cumene hydroperoxide (calculated on product solids). Evaporation of the solvent yields 233 g. of particulate solid product containing 1% catalyst.

EXAMPLE 9

A derivative of hexamethoxymethylmelamine designed to have on average three acrylamidomethyl groups and three 2-ethylhexylcarbamylmethyl groups, was prepared as follows.

The procedure is like that described in Example 8 above except the materials used are 117 g. of CYMEL 300, 63.9 g. of crystalline acrylamide, 155.7 g. of 2-ethylhexyl carbamate, one liter of cyclohexane, 0.067 g. of benzoquinone, and 1.65 g. of para-toluenesulfonic acid.

To the washed and dried product dissolved in methylene chloride is added 200 ppm of benzoquinone and 1.0% of cumene hydroperoxide (calculated on product solids). Evaporation of the solvent leaves 246 g. of viscous liquid product containing 1% catalyst.

EXAMPLE 10

A derivative of hexamethoxymethylmelamine designed to have on average three acrylamidomethyl groups was prepared as follows.

The preparative procedure is like that described above in Example 8 except the materials used are 234 g. of CYMEL 300, 127.8 g. of crystalline acrylamide, one liter of cyclohexane, 0.07 g. of benzoquinone, and 1.77 g. of para-toluenesulfonic acid.

The product was largely, but not completely, soluble in methylene chloride. Evaporation of the methylene chloride leaves 264 g. of particulate solid product containing no catalyst.

EXAMPLE 11

A derivative of tetraalkoxymethylbenzoguanamine designed to have on average three acryloyloxyethyloxymethyl groups and one methylcarbamylmethyl group, was prepared as follows.

A flask equipped with motorized stirrer and dry ice cooled distillation receiver is charged with 720 g. of CYMEL 1123, 641 g. of 2-hydroxyethyl acrylate, 138 g. of methyl carbamate, and 0.72 g. of hydroquinone. The solution is heated to 42° C. and then 16.5 g. of concentrated sulfuric acid is charged. During seven hours, the reaction temperature is increased in stages to 76° C. while a mixture of methanol and ethanol is distilled at 130 mm Hg pressure; 85% of the theoretical amount of alcohols is collected.

The cooled reaction product is dissolved in 1500 ml. of toluene and the solution is washed with one portion of sodium bicarbonate solution and several portions of deionized water. Evaporation of the solvent yields a viscous liquid product.

NMR analysis shows the following percentages of three functional groups (normalized to 100%): 56% —OCH$_2$CH$_2$OCOCH=CH$_2$, 35% —NHCOOCH$_3$, 10% —OCH$_3$/—OC$_2$H$_5$.

The product is dissolved in toluene and 200 ppm of hydroquinone and 1.0% of cumene hydroperoxide (calculated on product solids) are added. Evaporation of the solvent yields a viscous liquid product containing 1% catalyst.

EXAMPLE 12

A derivative of tetraalkoxymethylbenzoguanamine designed to have on average 2.4 acryloyloxymethyl groups and 2.5 methylcarbamylmethyl groups, was prepared as follows.

A flask equipped with motorized stirrer and dry ice cooled distillation receiver is charged with 150 g. of CYMEL 1123, 66.2 g. of acrylic acid, 0.12 g. of hydroquinone, and 1.5 g. of concentrated sulfuric acid. The reaction mixture is heated to 70° C. at 140 mm Hg pressure. During 2½ hours, a mixture of methanol and ethanol is distilled. Then the temperature is raised to 75° C. and 68.9 g. of methyl carbamate is charged. After 2 hours during which more alcohol is distilled, the product is cooled and dissolved in 250 ml. of methylene chloride. The solution is washed with one portion of 10% sodium bicarbonate solution, dried, and evaporated to give 144 g. of viscous liquid product.

MNR analysis shows the following percentages of three functional groups (normalized to 100%): 22% —OCOCH=CH$_2$, 52% —NHCOOCH$_3$, 26% —OCH$_3$/—OC$_2$H$_5$.

A solution of the product in methylene chloride is treated with 200 ppm of hydroquinone and 1.0% of cumene hydroperoxide (calculated on product solids). Evaporation of the solvent leaves a viscous liquid product containing 1% catalyst.

Some of the materials described in Examples 1-12, above, were formulated as "one-package" additives which contained the cumene hydroperoxide catalyst. In some production situations it may be preferable to keep the catalyst apart from the adhesion promoter so that it can be added separately during the rubber formulation process.

Rubber compositions for testing the products from Examples 1-12 are made as follows. Ingredients of the Base Compound shown in Table 1 are compounded in a lab Banbury to a drop temperature of 140° C. until thoroughly mixed. This Base Compound is divided into several parts for further compounding.

One part is further compounded with the cobalt boron complex salt (Manobond ®680C), sulfur and accelerator in amounts shown in Table I at 90°–100° C. until thoroughly mixed. This is a control rubber compound for testing without added organic adhesion promoters. It is designated "No Adh" in Tables II and III.

Another part of the Base compound is further compounded at 120° C. with the cobalt salt and resorcinol in amounts shown in Table I, and then is further compounded at 90°–100° C. with hexamethoxymethylmelamine (CYREZ ®964 resin powder concentrate), sulfur and accelerator in amounts shown in Table 1. This is a control rubber compound made with a conventional adhesion promoter and resorcinol. It is designated "Std Control" in Tables II and III.

Other parts of the Base Compound are individually blended at 120° C. with cobalt salt and a selected organic adhesion promoter prepared as described above in Examples 1-12 and then further blended with sulfur and accelerator at 90°-100° C. Several rubber compounds are prepared in this manner from each of the adhesion promoters prepared in Examples 1-12 above, for further testing.

TABLE I

| Ingredients for Rubber Compositions | |
|---|---|
| BASE COMPOUND | |
| Ingredient | Phr |
| Natural Rubber | 100 |
| Carbon Black | 45 |
| Silica | 11.6 |
| Zinc Oxide | 5.0 |
| Stearic Acid | 2.0 |
| Antioxidant (Santoflex ®13) | 1.0 |
| Antioxidant (Age Rite ® Resin D) | 1.0 |
| Curatives | |
| Sulfur | 3.5 |
| Accelerator (Santocure ®MOR) | 0.7 |
| Adhesion Promoters | |
| Cobalt Salt (Manobond 680C) | 0.7 |
| Hexamethoxymethylmelamine (Cyrez 964 Resin Powder Concentrate) (Standard Control only) | 4.5 |
| Resorcinol (Standard Control only) | 2.0 |
| Preparation Selected from Examples 1-12 | 4.9 |

The control and test rubber compounds made as above are all tested according to the following tests:

1. ASTM-D 2084 (153° C. cure, 1° arc, 50 in lb range) Oscillating Disc Curemeter.

In Table II, the measured Tmax and Tmin are reported in inch pounds and the measured Tc2 and Tc 90% are reported in minutes for each compound tested.

2. ASTM-D412 (samples cured based on Tc 90% at 153° C.)

Rubber Tensile Properties

In Table II the measured Break Stress and 300% Modulus are reported in pounds per square inch and the measured Break Elongation is reported as % elongation for each compound tested.

3. ASTM-D624—Die C. (Samples cured based on Tc 90 at 153° C.

Rubber Tear Test

In Table II the measured tear resistance is reported in pounds per inch for each composition tested.

4. Wire imbedment tests: Test samples are made from each of the several rubber compounds described above, i.e. the control compounds and the several rubber compounds containing adhesion promoters of the invention described in Examples 1-12. These test samples are made by imbedding closely spaced parallel strands of brass coated steel wire cords in sheets of the several rubber compounds, laminating the wire-reinforced rubber sheets, vulcanizing the laminates and then pulling the vulcanized laminates apart to separate the consolidated plies. In Table III, the pulling force required to separate the plies and the observed Appearance of the tire cords at the plane of separation are reported for several tests of samples made from each of the rubber compounds. Preparation of samples for each test are described in more detail as follows:

To imbed steel cords in the rubber, a calendered sheet of a selected rubber compound of about 1 mm thickness is rolled onto a 48 inch diameter drum and brass coated steel passenger tire cord is wound over the rubber sheet on the drum. The cords are spaced apart at about 3.5 cord elements per centimeter. A second sheet of the rubber compound is pressed over the wires. The uncured laminate is removed from the drum and cut into pieces for making test samples.

Four-inch squares are cut from the laminate with wires running parallel to one edge to make samples for some tests. Rectangular strips one inch wide and 5 inches long are cut from the laminate with wires running parallel to the long axis of each strip for use in other tests.

To make a test sample for the Cross Ply Adhesion tests, two of the four inch squares are laid up in a laminate with the cords in one ply running at right angles to those in the other. Between the two reinforced rubber plies, a square of Holland cloth is inserted. A rectangular window one inch wide and three inches long is cut from the Holland cloth square along a diagonal axis on the center of this square. The rubber plies are in direct contact at this window. Square woven fabric squares are placed on both sides of the laminate which is then pressed and cured at 160° C. for 20 minutes. Two other identical samples are laid up, pressed and cured at 160° C. for 10 minutes and 40 minutes respectively. In the curing process the rubber plies consolidate along the diagonal strip where they are in direct contact at the area of the diagonal window in the Holland cloth. After curing, the two rubber plies are pulled, tearing apart the consolidated strip at the window from one end along the length of the strip. In Table III, for each sample tested the average pulling force (LBS) required to separate the consolidated plies and the Appearance (APP) of the torn section are recorded under Original Adhesion.

The Appearance indicates how much of the wire surface is covered in the torn apart area. Thee best result is obtained when no exposed wire surface is observed in the torn area. The degree of coverage then is 100%. This indicates the plies have separated entirely in the rubber matrix, indicating strong adhesion of the rubber to the wire. The Appearance index indicates the observed degree of coverage of wires by rubber in the torn apart area, as follows:

| Appearance Index | Wire Coverage |
|---|---|
| 5.0 | 96-100% |
| 4.5 | 86-95% |
| 4.0 | 76-85% |
| 3.5 | 66-75% |
| 3.0 | 56-65% |
| 2.0 | 40-55% |
| 1.0 | 0-39% |

Another Cross Ply Adhesion test uses samples laid up and cured in a laminate the same as those made for the Original Adhesion Test, except the samples are aged, each for the number of days indicated in Table III, after they are laid up and before they are cured. These samples are aged at 29.5° C. in 85% relative humidity for the number of days indicated and then cured for 30 minutes at 160° C. The cured samples are then pulled apart and examined, the same as described above for the Original Adhesion Test. In Table III, under Green Humidity, the results from these tests are recorded.

Still another test uses laminates prepared like those for Original Adhesion, except a square of polyethylene terephthalate film is used instead of the Holland cloth square. The laminates are laid up and cured for 30 minutes at 160° C. The cured laminates are then trimmed along the edges to expose ends of the steel wires at the cut edges. One corner of each laminate is cut off along a diagonal line running parallel to the long axis of the window in the film, and spaced one inch outward from the axis of the window. Ends of the steel wires in both plies are exposed at the edge of this cut. The cured and cut samples are then immersed in a 20% saline solution in which each of the samples is aged for a number of days indicated in the Table. The aged samples are then pulled apart and observed as described for the previous tests. In Table III, under Corrosion, the pulling force and Appearance are recorded for each of the samples tested.

The 1"×5" strips which were cut from the uncured laminate as described above, are used for making samples to be tested for Parallel Ply Adhesion. The strips have been cut so the imbedded wire are parallel to the long axis of the strips. Two of the strips are laid up for lamination. A strip of carcass compound is laid over one surface of the two-ply laminate and a layer of undertread compound is laid over the other surface. These two outer layers overlap about one-half inch beyond each end of the two center layers. Carcass fillers are inserted between the overlaps at each end. At one end, a one-inch square of polyethylene terephthalate film is inserted between the overlaps and extends about one-half inch inward between the two center rubber plies. This sample is cured for 30 minutes at 160° C. to consolidate the plies. After curing, each sample is aged for a number of days shown in Table III at 70° C. in 95% relative humidity. Within one hour after the aging, the samples are pulled apart. The two center plies are separated at the end of the sample having the polyethylene terephthalate film and pulled apart along the length of the consolidated plies. The pulling force and Appearance are recorded in Table III under Cured Humidity, for each sample tested.

The samples used for each of the several tests and the additive used in each sample tested, are identified in Tables II and III by reference to a numbered Example above in which the preparation of the additive is described. Test results from all tests of samples made from the same rubber composition are tabulated on one line in Table II and in one column in Table III.

TABLE II

| | Oscillating Disc Curemeter ASTM-D 2084 | | | | Rubber Tensile Properties ASTM-D412 (Average of 5 Pulls) | | | Rubber Tear Test ASTM-D624, Die C (Ave of 3) |
|---|---|---|---|---|---|---|---|---|
| CMPD ID. | T max (IN*LBS) | T min (IN*LBS) | Ts2 (MINS) | Tc 90% (MINS) | BREAK STRESS (PSI) | BREAK ELONG. | 300% MODULUS (PSI) | TEAR RESIST. (LBS/IN) |
| STD CTRL | 38.5 | 7.9 | 3.6 | 17.0 | 3275.8 | 481% | 1655.6 | 307.4 |
| NO AHD | 33.3 | 8.3 | 4.4 | 13.5 | 2427.5 | 346% | 1985.6 | 224.1 |
| EX. 1 | 37.6 | 7.5 | 4.5 | 17.4 | 3219.8 | 413% | 2010.3 | 454.6 |
| EX. 2 | 37.3 | 8.3 | 4.5 | 17.1 | 3533.6 | 472% | 1971.7 | 366.0 |
| EX. 3 | 36.9 | 7.5 | 4.6 | 17.8 | 3371.4 | 468% | 1891.3 | 376.8 |
| EX. 4 | 33.1 | 4.9 | 4.0 | 14.1 | 3195.0 | 479% | 1671.5 | 509.9 |
| EX. 5 | 33.8 | 7.2 | 4.9 | 16.8 | 2769.2 | 420% | 1706.7 | 306.9 |
| EX. 6 | 38.0 | 7.6 | 4.3 | 20.0 | 3404.0 | 457% | 1989.6 | 432.9 |
| EX. 7 | 37.4 | 7.3 | 4.5 | 15.4 | 3126.5 | 451% | 1866.9 | 280.1 |
| EX. 8 | 36.3 | 7.5 | 4.2 | 14.8 | 3176.9 | 463% | 1787.4 | 506.2 |
| EX. 9 | 33.3 | 6.2 | 4.7 | 13.0 | 3128.8 | 494% | 1583.2 | 506.8 |
| EX. 10 | 44.2 | 6.9 | 4.8 | 19.2 | 3435.7 | 425% | 2283.6 | 325.4 |
| EX. 11 | 36.0 | 8.0 | 4.5 | 16.9 | 3592.0 | 503% | 1849.5 | 247.3 |
| EX. 12 | 38.1 | 7.6 | 4.6 | 15.4 | 3461.3 | 495% | 1844.2 | 243.6 |

TABLE III

| TEST/SAMPLE | | STD CTRL. LBS | APP | NO ADH. LBS | APP | EXAMPLE 1 LBS | APP | EXAMPLE 2 LBS | APP | EXAMPLE 3 LBS | APP |
|---|---|---|---|---|---|---|---|---|---|---|---|
| ORIGINAL ADHESION | | | | | | | | | | | |
| CURES | 10' @ 320 F. | 68 | 5.0 | 94 | 5.0 | 85 | 5.0 | 77 | 5.0 | 85 | 5.0 |
| | 20' @ 320 F. | 61 | 5.0 | 81 | 5.0 | 84 | 5.0 | 80 | 5.0 | 84 | 5.0 |
| | 40' @ 320 F. | 59 | 5.0 | 83 | 5.0 | 59 | 5.0 | 69 | 5.0 | 77 | 5.0 |
| GREEN HUMIDITY | | | | | | | | | | | |
| AGED | 3 DAYS | 58 | 4.5 | 71 | 5.0 | 59 | 4.5 | 68 | 4.5 | 60 | 4.5 |
| | 7 DAYS | 60 | 4.5 | 70 | 4.5 | 61 | 3.0 | 63 | 3.0 | 58 | 3.0 |
| | 10 DAYS | 56 | 4.0 | 69 | 4.5 | 65 | 3.5 | 53 | 3.5 | 60 | 3.5 |
| | 14 DAYS | 60 | 4.5 | 67 | 4.0 | 52 | 3.0 | 52 | 3.0 | 46 | 2.5 |
| | 21 DAYS | 59 | 4.5 | 64 | 3.0 | 60 | 3.0 | 53 | 3.5 | 60 | 3.0 |
| CURED HUMIDITY | | | | | | | | | | | |
| AGED | 0 DAYS | 45 | 5.0 | 49 | 5.0 | 48 | 5.0 | 48 | 5.0 | 49 | 5.0 |
| | 3 DAYS | 49 | 5.0 | 73 | 4.5 | 66 | 5.0 | 68 | 5.0 | 69 | 5.0 |
| | 7 DAYS | 50 | 4.5 | 68 | 3.5 | 65 | 5.0 | 71 | 5.0 | 65 | 5.0 |
| | 14 DAYS | 48 | 4.5 | 57 | 3.5 | 56 | 4.5 | 66 | 4.5 | 56 | 5.0 |
| | 21 DAYS | 46 | 4.5 | 56 | 3.0 | 53 | 5.0 | 60 | 5.0 | 56 | 5.0 |
| CORROSION | | | | | | | | | | | |
| AGED | 0 DAYS | 48 | 5.0 | 72 | 5.0 | 57 | 5.0 | 56 | 5.0 | 61 | 5.0 |
| | 3 DAYS | 52 | 5.0 | 64 | 5.0 | 55 | 5.0 | 67 | 5.0 | 57 | 5.0 |
| | 7 DAYS | 57 | 5.0 | 71 | 5.0 | 61 | 5.0 | 64 | 5.0 | 53 | 5.0 |
| | 10 DAYS | 56 | 5.0 | 64 | 5.0 | 62 | 5.0 | 71 | 5.0 | 63 | 5.0 |
| | 14 DAYS | 54 | 5.0 | 69 | 5.0 | 65 | 5.0 | 65 | 5.0 | 62 | 5.0 |

TABLE III-continued

| TEST/SAMPLE | | EXAMPLE 4 LBS | EXAMPLE 4 APP | EXAMPLE 5 LBS | EXAMPLE 5 APP | EXAMPLE 6 LBS | EXAMPLE 6 APP | EXAMPLE 7 LBS | EXAMPLE 7 APP | EXAMPLE 8 LBS | EXAMPLE 8 APP |
|---|---|---|---|---|---|---|---|---|---|---|---|
| | 21 DAYS | 56 | 5.0 | 70 | 5.0 | 59 | 5.0 | 69 | 5.0 | 62 | 5.0 |
| ORIGINAL ADHESION | | | | | | | | | | | |
| CURES | 10' @ 320 F. | 103 | 5.0 | 103 | 5.0 | 69 | 5.0 | 79 | 5.0 | 92 | 5.0 |
| | 20' @ 320 F. | 78 | 5.0 | 77 | 5.0 | 75 | 5.0 | 86 | 5.0 | 77 | 5.0 |
| | 40' @ 320 F. | 68 | 5.0 | 55 | 5.0 | 60 | 5.0 | 65 | 5.0 | 69 | 5.0 |
| GREEN HUMIDITY | | | | | | | | | | | |
| AGED | 3 DAYS | 83 | 5.0 | 72 | 5.0 | 51 | 5.0 | 65 | 5.0 | 66 | 5.0 |
| | 7 DAYS | 63 | 3.5 | 60 | 3.5 | 57 | 3.5 | 82 | 5.0 | 79 | 5.0 |
| | 10 DAYS | 66 | 3.0 | 63 | 3.5 | 60 | 3.0 | 80 | 5.0 | 80 | 5.0 |
| | 14 DAYS | 56 | 3.5 | 56 | 3.5 | 50 | 3.5 | 69 | 5.0 | 73 | 4.5 |
| | 21 DAYS | 89 | 3.5 | 49 | 3.0 | 61 | 3.5 | 73 | 5.0 | 69 | 4.0 |
| CURED HUMIDITY | | | | | | | | | | | |
| AGED | 0 DAYS | 60 | 5.0 | 48 | 5.0 | 54 | 5.0 | 61 | 5.0 | 48 | 5.0 |
| | 3 DAYS | 73 | 5.0 | 64 | 5.0 | 60 | 5.0 | 65 | 5.0 | 61 | 5.0 |
| | 7 DAYS | 73 | 4.5 | 66 | 4.5 | 64 | 4.5 | 61 | 4.5 | 69 | 4.5 |
| | 14 DAYS | 71 | 4.5 | 56 | 5.0 | 54 | 5.0 | 60 | 4.5 | 55 | 4.5 |
| | 21 DAYS | 66 | 5.0 | 66 | 5.0 | 59 | 5.0 | 54 | 5.0 | 64 | 5.0 |
| CORROSION | | | | | | | | | | | |
| AGED | 0 DAYS | 55 | 5.0 | 52 | 5.0 | 57 | 5.0 | 58 | 5.0 | 63 | 5.0 |
| | 3 DAYS | 56 | 5.0 | 55 | 5.0 | 59 | 5.0 | 58 | 5.0 | 63 | 5.0 |
| | 7 DAYS | 61 | 5.0 | 52 | 5.0 | 59 | 5.0 | 60 | 5.0 | 64 | 5.0 |
| | 10 DAYS | 63 | 5.0 | 54 | 5.0 | 59 | 5.0 | 63 | 5.0 | 63 | 5.0 |
| | 14 DAYS | 53 | 5.0 | 54 | 5.0 | 59 | 5.0 | 61 | 5.0 | 60 | 5.0 |
| | 21 DAYS | 51 | 5.0 | 48 | 5.0 | 58 | 5.0 | 57 | 5.0 | 55 | 5.0 |

| TEST/SAMPLE | | EXAMPLE 9 LBS | EXAMPLE 9 APP | EXAMPLE 10 LBS | EXAMPLE 10 APP | EXAMPLE 11 LBS | EXAMPLE 11 APP | EXAMPLE 12 LBS | EXAMPLE 12 APP |
|---|---|---|---|---|---|---|---|---|---|
| ORIGINAL ADHESION | | | | | | | | | |
| CURES | 10' @ 320 F. | 101 | 5.0 | 83 | 5.0 | 81 | 5.0 | 92 | 5.0 |
| | 20' @ 320 F. | 88 | 5.0 | 63 | 5.0 | 95 | 5.0 | 90 | 5.0 |
| | 40' @ 320 F. | 76 | 4.5 | 58 | 5.0 | 77 | 5.0 | 90 | 5.0 |
| GREEN HUMIDITY | | | | | | | | | |
| AGED | 3 DAYS | 79 | 5.0 | 61 | 5.0 | 78 | 5.0 | 70 | 4.5 |
| | 7 DAYS | 93 | 4.0 | 55 | 4.0 | 87 | 4.5 | 78 | 5.0 |
| | 10 DAYS | 96 | 5.0 | 45 | 3.0 | 93 | 4.5 | 76 | 4.5 |
| | 14 DAYS | 76 | 5.0 | 48 | 3.5 | 100 | 4.5 | 69 | 4.5 |
| | 21 DAYS | 67 | 3.5 | 57 | 3.5 | 83 | 4.5 | 73 | 4.0 |
| CURED HUMIDITY | | | | | | | | | |
| AGED | 0 DAYS | 61 | 5.0 | 52 | 5.0 | 63 | 5.0 | 56 | 5.0 |
| | 3 DAYS | 71 | 5.0 | 52 | 5.0 | 72 | 5.0 | 63 | 5.0 |
| | 7 DAYS | 79 | 5.0 | 55 | 4.5 | 82 | 4.5 | 72 | 4.5 |
| | 14 DAYS | 71 | 5.0 | 58 | 5.0 | 63 | 4.5 | 63 | 4.0 |
| | 21 DAYS | 69 | 5.0 | 54 | 5.0 | 61 | 4.5 | 52 | 4.0 |
| CORROSION | | | | | | | | | |
| AGED | 0 DAYS | 72 | 5.0 | 54 | 5.0 | 79 | 5.0 | 64 | 5.0 |
| | 3 DAYS | 68 | 5.0 | 58 | 5.0 | 72 | 5.0 | 76 | 5.0 |
| | 7 DAYS | 65 | 5.0 | 56 | 5.0 | 68 | 5.0 | 71 | 5.0 |
| | 10 DAYS | 68 | 5.0 | 54 | 5.0 | 66 | 5.0 | 66 | 5.0 |
| | 14 DAYS | 72 | 5.0 | 56 | 5.0 | 74 | 5.0 | 73 | 5.0 |
| | 21 DAYS | 66 | 5.0 | 54 | 5.0 | 75 | 5.0 | 74 | 5.0 |

Tests reported in Table II and III demonstrate the suitability of the compounds tested, for use as additives in rubber products made with tire cords. In tests of break stress and break elongation, the samples made with additives of the invention exceeded the strength of samples without additives (No Adh) and compared favorably with samples made with a conventional additive (Std Control). In tests of tear strength all of the samples embodying the invention exceeded the No Adh control sample and most exceeded the Std Control sample. In the Appearance test, which is an index of tire cord adhesion, the samples of the invention are superior to the No Adh samples, particularly in the cured humidity test, and compare favorably with the Std Control samples in most cases.

EXAMPLE 13

A derivative of hexamethoxymethylmelamine designed to have on average four acrylamidomethyl groups and two propylcarbamylmethyl groups was prepared as follows:

A two liter flask equipped with motorized stirrer and distillation take-off leading to dry ice cooled receivers is charged with 301.7 g. of CYMEL 303, which is a mixture of monomeric and oligomeric hexamethoxymethylmelamine having a higher proportion of oligomer than CYMEL 300. Also, 361.4 g. of a 53.1% solution of acrylamide in water and 0.132 g. of benzoquinone are charged to the flask. The mixture is stirred and heated in an 85° C. oil bath while water is distilled at 50 mm Hg until at least 95% of water from the acrylamide is collected. Then to the flask is charged 139.1 g. of n-propyl carbamate, 7.0 g. of n-propanol and 2.21 g. of concentrated sulfuric acid dissolved in 6.0 g. of methanol. Pressure on the system is gradually reduced over a period of about 80 minutes to 50 mm Hg. When 90% of the theoretical methanol has distilled, methylene chloride is added to the molten product to make a 50% solution.

The product solution is diluted to 20% solids, washed with 5% sodium bicarbonate aqueous solution then with deionized water and dried over anhydrous potassium carbonate. To the dried solution is added 200 ppm benzoquinone (based on solids). The solvent is evaporated leaving a particulate solid product. An alternate method for purification and isolation of the product is to dissolve the reaction product in a water miscible alcohol, with potassium hydroxide as needed to neutralize the acid, instead of methylene chloride. The solution in alcohol is then poured slowly into a large volume of water to precipitate the product which is then isolated by filtration.

A series of additive compositions comprising the product from Example 13 were made, with or without added cumene hydroperoxide catalyst and with or without added CYREZ 963, in the proportions shown in Table IV below. The amounts of ingredients are shown in parts per hundred parts rubber as the additives were used in rubber compositions described below. CYREZ 963 is a mixture of monomeric and oligomeric hexamethoxymethylmelamine.

TABLE IV

| ADDITIVE NO. | ADHESION PROMOTERS PHR | | |
|---|---|---|---|
| | EX. 13 PRODUCT | CYREZ 963 | CHPO CATALYST |
| 13-1 | 2.5 | 0 | 0 |
| 13-2 | 2.5 | 0 | 0.0125 |
| 13-3 | 2.5 | 0 | 0.025 |
| 13-4 | 5.0 | 0 | 0 |
| 13-5 | 5.0 | 0 | 0.025 |
| 13-6 | 5.0 | 0 | 0.050 |
| 13-7 | 1.875 | 0.625 | 0 |
| 13-8 | 1.875 | 0.625 | 0.0094 |
| 13-9 | 1.875 | 0.625 | 0.0188 |
| 13-10 | 3.75 | 1.25 | 0 |
| 13-11 | 3.75 | 1.25 | 0.0188 |
| 13-12 | 3.75 | 1.25 | 0.0375 |
| 13-13 | 1.25 | 1.25 | 0 |
| 13-14 | 1.25 | 1.25 | 0.0063 |
| 13-15 | 1.25 | 1.25 | 0.0125 |
| 13-16 | 2.5 | 2.5 | 0 |
| 13-17 | 2.5 | 2.5 | 0.0125 |
| 13-18 | 2.5 | 2.5 | 0.025 |

Rubber compositions were made the same as those described above in Table I except the adhesion promoters used in addition to cobalt salt were those additives described in Table IV and the amount (PHR) of each ingredient of the additive used in the rubber compositions was the amount shown in Table IV (CYREZ 964 resin powder concentrate in Table I was replaced with CYREZ 963 liquid). The rubber compositions were made into samples which were tested as described above and the test results were tabulated in Tables V and VI below. Those test results demonstrate that the new adhesion promoters of the invention can be used in combination with prior art adhesion promoters such as hexamethoxymethylmelamine to improve tire cord adhesion without the need for resorcinol or its equivalent.

The additional additive in the Example 13 compositions, in addition to the vinyl substituted derivative of the invention is hexamethoxymethylmelamine. Rubber compositions of the invention may comprise, in addition to additives having vinyl terminated radicals as described, additional additives such as hexamethoxymethylmelamine or other alkoxymethyl (alkoxy containing 1–5 carbon atoms) or hydroxymethyl derivatives of melamine, acetoguanamine, benzoguanamine, cyclohexylguanamine, or glycoluril.

TABLE IV

| CMPD ID | Oscillating Disc Curemeter ASTM-D 2084 | | | | Rubber Tensile Properties ASTM-D412 (Average of 5 Pulls) | | | | Rubber Tear Test ASTM-D624, Die C (Ave of 3) | |
|---|---|---|---|---|---|---|---|---|---|---|
| | T MIN (IN LBS) | T MAX (IN LBS) | Ts2 (MINS) | Tc 90% (MINS) | BREAK STRESS (PSI) | BREAK ELONG. | 300% MOD (PSI) | | TEAR RESIST (LBS/IN) | SHORE A HARONESS |
| STD CTRL | 7.2 | 41.2 | 4.3 | 19.8 | 1974.8 | 302% | 2003.0 | | 238.8 | 67 |
| NO ADH | 8.1 | 33.3 | 4.9 | 14.1 | 2574.2 | 404% | 1630.3 | | 263.9 | 59 |
| 13-1 | 6.4 | 37.3 | 4.2 | 15.7 | 3166.0 | 438% | 1965.9 | | 310.1 | 65 |
| 13-2 | 6.5 | 37.7 | 5.0 | 15.4 | 3321.6 | 474% | 1870.6 | | 276.8 | 65 |
| 13-3 | 6.5 | 37.4 | 4.8 | 14.7 | 2961.2 | 436% | 1809.2 | | 271.6 | 65 |
| 13-4 | 6.2 | 38.8 | 4.6 | 18.2 | 3182.5 | 438% | 1989.4 | | 389.8 | 65 |
| 13-5 | 6.1 | 38.4 | 4.3 | 17.5 | 3301.1 | 457% | 1991.9 | | 492.5 | 66 |
| 13-6 | 6.7 | 39.5 | 4.2 | 18.4 | 3273.6 | 443% | 2061.1 | | 448.9 | 68 |
| 13-7 | 6.5 | 38.3 | 4.9 | 16.1 | 3213.0 | 431% | 2038.7 | | 377.1 | 70 |
| 13-8 | 6.6 | 38.8 | 4.7 | 16.1 | 3182.2 | 438% | 2012.5 | | 339.1 | 69 |
| 13-9 | 6.5 | 38.8 | 4.7 | 16.0 | 3284.8 | 440% | 2063.3 | | 497.9 | 66 |
| 13-10 | 6.6 | 40.2 | 4.8 | 19.9 | 3348.4 | 463% | 1976.1 | | 466.8 | 67 |
| 13-11 | 6.4 | 41.2 | 4.8 | 20.6 | 3349.5 | 435% | 2158.2 | | 384.6 | 69 |
| 13-12 | 6.4 | 41.4 | 4.5 | 20.1 | 3527.5 | 478% | 2019.6 | | 481.7 | 69 |
| 13-13 | 7.3 | 39.6 | 4.8 | 17.4 | 3502.9 | 462% | 2065.8 | | 403.6 | 66 |
| 13-14 | 6.9 | 40.7 | 5.0 | 18.3 | 3420.0 | 447% | 2101.6 | | 367.1 | 67 |
| 13-15 | 7.0 | 39.2 | 5.1 | 17.7 | 3449.0 | 459% | 2022.4 | | 386.7 | 68 |
| 13-16 | 6.8 | 40.0 | 5.1 | 20.0 | 3120.7 | 416% | 2086.2 | | 283.6 | 67 |
| 13-17 | 7.0 | 42.8 | 4.9 | 21.3 | 3380.9 | 442% | 2133.9 | | 409.2 | 69 |
| 13-18 | 6.7 | 41.0 | 5.3 | 21.4 | 3478.1 | 465% | 2066.6 | | 557.7 | 68 |

TABLE VI

| TEST/SAMPLE | STD CTRL. | | NO ADH. | | EXAMPLE 13-1 | | EXAMPLE 13-2 | | EXAMPLE 13-3 | |
|---|---|---|---|---|---|---|---|---|---|---|
| | LBS | APP | LBS | APP | LBS | APP | LBS | APP | LBS | APP |
| ORIGINAL ADHESION | | | | | | | | | | |
| CURES 10' @ 320 F. | 47.0 | 5.0 | 78.0 | 4.5 | 114.0 | 5.0 | 113.0 | 5.0 | 107.0 | 5.0 |
| 20' @ 320 F. | 41.0 | 5.0 | 70.0 | 3.5 | 68.0 | 5.0 | 66.0 | 5.0 | 66.0 | 5.0 |
| 40' @ 320 F. | 40.0 | 5.0 | 71.0 | 3.5 | 69.0 | 5.0 | 69.0 | 5.0 | 80.0 | 5.0 |
| GREEN HUMIDITY | | | | | | | | | | |

TABLE VI-continued

| | | EXAMPLE 13-4 | | EXAMPLE 13-5 | | EXAMPLE 13-6 | | EXAMPLE 13-7 | | EXAMPLE 13-8 | |
|---|---|---|---|---|---|---|---|---|---|---|---|
| AGED | 3 DAYS | 42.0 | 4.5 | 63.0 | 4.0 | 65.0 | 4.0 | 71.0 | 4.0 | 62.0 | 4.0 |
| | 7 DAYS | 44.0 | 4.5 | 46.0 | 3.5 | 55.0 | 4.0 | 66.0 | 3.5 | 62.0 | 3.5 |
| | 14 DAYS | 50.0 | 4.5 | 61.0 | 3.0 | 53.0 | 3.5 | 48.0 | 3.5 | 69.0 | 3.5 |
| | 21 DAYS | 47.0 | 4.5 | 61.0 | 2.0 | 55.0 | 3.5 | 47.0 | 4.0 | 60.0 | 3.5 |
| CURED HUMIDITY | | | | | | | | | | | |
| AGED | 0 DAYS | 27.0 | 5.0 | 41.0 | 4.5 | 46.0 | 5.0 | 43.0 | 5.0 | 46.0 | 5.0 |
| | 3 DAYS | 49.0 | 5.0 | 69.0 | 4.0 | 66.0 | 5.0 | 66.0 | 5.0 | 66.0 | 5.0 |
| | 7 DAYS | 50.0 | 5.0 | 57.0 | 3.5 | 55.0 | 4.5 | 55.0 | 4.5 | 52.0 | 5.0 |
| | 14 DAYS | 45.0 | 5.0 | 62.0 | 3.0 | 59.0 | 4.5 | 49.0 | 4.5 | 57.0 | 4.5 |
| | 21 DAYS | 49.0 | 4.5 | 64.0 | 2.0 | 58.0 | 4.0 | 51.0 | 4.0 | 55.0 | 4.5 |
| CORROSION | | | | | | | | | | | |
| AGED | 0 DAYS | 47.0 | 5.0 | 82.0 | 4.5 | 75.0 | 5.0 | 78.0 | 5.0 | 70.0 | 5.0 |
| | 3 DAYS | 43.0 | 5.0 | 75.0 | 4.0 | 71.0 | 5.0 | 67.0 | 5.0 | 71.0 | 5.0 |
| | 7 DAYS | 42.0 | 4.5 | 69.0 | 4.0 | 62.0 | 5.0 | 61.0 | 5.0 | 64.0 | 5.0 |
| | 14 DAYS | 43.0 | 4.5 | 55.0 | 3.5 | 63.0 | 5.0 | 66.0 | 4.5 | 59.0 | 4.5 |
| | 21 DAYS | 41.0 | 4.5 | 71.0 | 3.0 | 69.0 | 5.0 | 65.0 | 4.5 | 69.0 | 4.5 |

| TEST/SAMPLE | | EXAMPLE 13-4 | | EXAMPLE 13-5 | | EXAMPLE 13-6 | | EXAMPLE 13-7 | | EXAMPLE 13-8 | |
|---|---|---|---|---|---|---|---|---|---|---|---|
| | | LBS | APP | LBS | APP | LBS | APP | LBS | APP | LBS | APP |
| ORIGINAL ADHESION | | | | | | | | | | | |
| CURES | 10′ @ 320 F. | 114.0 | 5.0 | 111.0 | 5.0 | 118.0 | 5.0 | 97.0 | 5.0 | 109.0 | 5.0 |
| | 20′ @ 320 F. | 74.0 | 5.0 | 57.0 | 5.0 | 78.0 | 5.0 | 71.0 | 5.0 | 67.0 | 5.0 |
| | 40′ @ 320 F. | 71.0 | 5.0 | 71.0 | 5.0 | 86.0 | 5.0 | 67.0 | 5.0 | 68.0 | 5.0 |
| GREEN HUMIDITY | | | | | | | | | | | |
| AGED | 3 DAYS | 69.0 | 4.0 | 61.0 | 4.5 | 71.0 | 4.0 | 62.0 | 4.0 | 61.0 | 4.0 |
| | 7 DAYS | 63.0 | 4.0 | 61.0 | 4.0 | 60.0 | 3.5 | 61.0 | 4.0 | 58.0 | 3.5 |
| | 14 DAYS | 55.0 | 3.5 | 52.0 | 4.0 | 54.0 | 3.5 | 55.0 | 3.5 | 63.0 | 3.0 |
| | 21 DAYS | 56.0 | 3.5 | 56.0 | 3.5 | 55.0 | 4.0 | 55.0 | 4.0 | 62.0 | 3.0 |
| CURED HUMIDITY | | | | | | | | | | | |
| AGED | 0 DAYS | 52.0 | 5.0 | 51.0 | 5.0 | 41.0 | 5.0 | 44.0 | 4.5 | 47.0 | 5.0 |
| | 3 DAYS | 66.0 | 5.0 | 72.0 | 5.0 | 69.0 | 5.0 | 65.0 | 4.5 | 63.0 | 5.0 |
| | 7 DAYS | 54.0 | 4.5 | 54.0 | 5.0 | 62.0 | 5.0 | 65.0 | 4.5 | 58.0 | 5.0 |
| | 14 DAYS | 58.0 | 4.0 | 57.0 | 4.5 | 51.0 | 4.5 | 60.0 | 4.0 | 60.0 | 4.5 |
| | 21 DAYS | 61.0 | 3.5 | 58.0 | 4.5 | 55.0 | 4.0 | 60.0 | 4.0 | 60.0 | 4.5 |
| CORROSION | | | | | | | | | | | |
| AGED | 0 DAYS | 69.0 | 5.0 | 62.0 | 5.0 | 79.0 | 5.0 | 70.0 | 5.0 | 77.0 | 5.0 |
| | 3 DAYS | 76.0 | 5.0 | 72.0 | 5.0 | 76.0 | 5.0 | 72.0 | 5.0 | 73.0 | 5.0 |
| | 7 DAYS | 71.0 | 5.0 | 72.0 | 5.0 | 77.0 | 5.0 | 71.0 | 5.0 | 66.0 | 5.0 |
| | 14 DAYS | 63.0 | 5.0 | 70.0 | 5.0 | 75.0 | 5.0 | 72.0 | 5.0 | 59.0 | 5.0 |
| | 21 DAYS | 69.0 | 4.5 | 75.0 | 4.5 | 80.0 | 4.5 | 56.0 | 5.0 | 70.0 | 4.5 |

| TEST/SAMPLE | | EXAMPLE 13-9 | | EXAMPLE 13-10 | | EXAMPLE 13-11 | | EXAMPLE 13-12 | | EXAMPLE 13-13 | |
|---|---|---|---|---|---|---|---|---|---|---|---|
| | | LBS | APP | LBS | APP | LBS | APP | LBS | APP | LBS | APP |
| ORIGINAL ADHESION | | | | | | | | | | | |
| CURES | 10′ @ 320 F. | 123.0 | 5.0 | 117.0 | 5.0 | 104.0 | 5.0 | 108.0 | 5.0 | 122.0 | 5.0 |
| | 20′ @ 320 F. | 72.0 | 5.0 | 60.0 | 5.0 | 68.0 | 5.0 | 60.0 | 5.0 | 67.0 | 5.0 |
| | 40′ @ 320 F. | 63.0 | 5.0 | 65.0 | 5.0 | 56.0 | 5.0 | 70.0 | 5.0 | 74.0 | 5.0 |
| GREEN HUMIDITY | | | | | | | | | | | |
| AGED | 3 DAYS | 59.0 | 4.0 | 59.0 | 4.0 | 56.0 | 4.0 | 54.0 | 4.0 | 72.0 | 4.0 |
| | 7 DAYS | 59.0 | 4.0 | 67.0 | 4.0 | 64.0 | 4.5 | 62.0 | 4.0 | 53.0 | 3.5 |
| | 14 DAYS | 57.0 | 3.5 | 59.0 | 3.5 | 51.0 | 3.5 | 56.0 | 3.5 | 52.0 | 4.0 |
| | 21 DAYS | 63.0 | 3.0 | 61.0 | 3.5 | 54.0 | 3.5 | 54.0 | 3.5 | 56.0 | 4.0 |
| CURED HUMIDITY | | | | | | | | | | | |
| AGED | 0 DAYS | 48.0 | 5.0 | 46.0 | 5.0 | 36.0 | 5.0 | 48.0 | 5.0 | 50.0 | 5.0 |
| | 3 DAYS | 72.0 | 5.0 | 70.0 | 5.0 | 63.0 | 5.0 | 62.0 | 5.0 | 60.0 | 5.0 |
| | 7 DAYS | 57.0 | 5.0 | 63.0 | 5.0 | 61.0 | 5.0 | 62.0 | 5.0 | 67.0 | 5.0 |
| | 14 DAYS | 63.0 | 5.0 | 61.0 | 4.5 | 55.0 | 4.5 | 57.0 | 5.0 | 63.0 | 5.0 |
| | 21 DAYS | 64.0 | 4.5 | 57.0 | 4.5 | 51.0 | 4.0 | 52.0 | 4.5 | 54.0 | 5.0 |
| CORROSION | | | | | | | | | | | |
| AGED | 0 DAYS | 68.0 | 5.0 | 72.0 | 5.0 | 71.0 | 5.0 | 80.0 | 5.0 | 66.0 | 5.0 |
| | 3 DAYS | 75.0 | 5.0 | 70.0 | 5.0 | 69.0 | 5.0 | 72.0 | 5.0 | 74.0 | 5.0 |
| | 7 DAYS | 75.0 | 5.0 | 65.0 | 5.0 | 69.0 | 5.0 | 70.0 | 5.0 | 69.0 | 5.0 |
| | 14 DAYS | 67.0 | 5.0 | 68.0 | 5.0 | 64.0 | 5.0 | 70.0 | 5.0 | 75.0 | 4.5 |
| | 21 DAYS | 69.0 | 5.0 | 73.0 | 5.0 | 62.0 | 5.0 | 62.0 | 5.0 | 72.0 | 4.5 |

| TEST/SAMPLE | | EXAMPLE 13-14 | | EXAMPLE 13-15 | | EXAMPLE 13-16 | | EXAMPLE 13-17 | | EXAMPLE 13-18 | |
|---|---|---|---|---|---|---|---|---|---|---|---|
| | | LBS | APP | LBS | APP | LBS | APP | LBS | APP | LBS | APP |
| ORIGINAL ADHESION | | | | | | | | | | | |
| CURES | 10′ @ 320 F. | 126.0 | 5.0 | 95.0 | 5.0 | 130.0 | 5.0 | 107.0 | 5.0 | 92.0 | 5.0 |
| | 20′ @ 320 F. | 64.0 | 5.0 | 62.0 | 5.0 | 51.0 | 5.0 | 59.0 | 5.0 | 60.0 | 5.0 |
| | 40′ @ 320 F. | 71.0 | 5.0 | 73.0 | 5.0 | 59.0 | 5.0 | 66.0 | 5.0 | 70.0 | 5.0 |
| GREEN HUMIDITY | | | | | | | | | | | |
| AGED | 3 DAYS | 76.0 | 4.0 | 55.0 | 3.5 | 57.0 | 4.0 | 63.0 | 4.0 | 63.0 | 4.0 |
| | 7 DAYS | 62.0 | 4.0 | 64.0 | 3.5 | 71.0 | 4.0 | 63.0 | 4.0 | 70.0 | 4.0 |
| | 14 DAYS | 49.0 | 4.0 | 59.0 | 3.5 | 61.0 | 3.5 | 57.0 | 3.5 | 70.0 | 4.0 |
| | 21 DAYS | 55.0 | 4.0 | 55.0 | 4.0 | 57.0 | 4.0 | 56.0 | 4.0 | 69.0 | 4.0 |
| CURED HUMIDITY | | | | | | | | | | | |
| AGED | 0 DAYS | 46.0 | 5.0 | 48.0 | 5.0 | 53.0 | 5.0 | 44.0 | 5.0 | 46.0 | 5.0 |
| | 3 DAYS | 65.0 | 5.0 | 77.0 | 5.0 | 63.0 | 5.0 | 66.0 | 5.0 | 63.0 | 5.0 |

TABLE VI-continued

|  | | | | | | | | | | |
|---|---|---|---|---|---|---|---|---|---|---|
|  | 7 DAYS | 62.0 | 5.0 | 67.0 | 5.0 | 58.0 | 5.0 | 63.0 | 5.0 | 55.0 | 5.0 |
|  | 14 DAYS | 56.0 | 5.0 | 73.0 | 5.0 | 61.0 | 5.0 | 63.0 | 4.5 | 50.0 | 4.5 |
|  | 21 DAYS | 55.0 | 4.5 | 58.0 | 5.0 | 45.0 | 4.5 | 54.0 | 4.5 | 49.0 | 4.0 |
| CORROSION | | | | | | | | | | | |
| AGED | 0 DAYS | 74.0 | 5.0 | 72.0 | 5.0 | 77.0 | 5.0 | 60.0 | 5.0 | 71.0 | 5.0 |
|  | 3 DAYS | 73.0 | 5.0 | 70.0 | 5.0 | 82.0 | 5.0 | 74.0 | 5.0 | 60.0 | 5.0 |
|  | 7 DAYS | 65.0 | 5.0 | 72.0 | 5.0 | 68.0 | 5.0 | 71.0 | 5.0 | 69.0 | 5.0 |
|  | 14 DAYS | 71.0 | 4.5 | 77.0 | 4.5 | 66.0 | 4.5 | 73.0 | 4.5 | 79.0 | 5.0 |
|  | 21 DAYS | 69.0 | 4.5 | 70.0 | 4.5 | 68.0 | 4.0 | 68.0 | 4.5 | 85.0 | 4.5 |

The rubber compositions of the invention can be used to advantage, instead of the prior art compositions which contain resorcinol, for making reinforced rubber plies having improved tire cord adhesion in rubber tires and for making tire treads having improved tear strength and toughness. The compositions can be used for making rubber belts, rubber hoses, rubber gaskets, molded and extruded rubber products and the like.

The invention can be used to improve rubber products made with fiber plies and cords such as polyaramid and polyester cords and fabrics as well as those made with steel cords. For making rubber products without reinforcing cords or fabrics, the invention can be used to improve tensile properties, hardness, and tear strength of the rubber products.

We claim:

1. A vulcanizable rubber composition comprising uncured rubber, a vulcanizing agent and at least one additive selected from the group consisting of derivatives of melamine, acetoguanamine, benzoguanamine, cyclohexylguanamine and glycoluril monomers and oligomers of these monomers, which has been substituted on average at two or more positions on the monomer or on each unit of the oligomer with vinyl terminated radicals, the vulcanizable rubber composition being free of resorcinol.

2. A vulcanizable rubber composition defined by claim 1 wherein at least one of the additives has been further substituted on average at one or more positions with a radical which comprises carbamylmethyl or amidomethyl.

3. A vulcanizable rubber composition defined by claim 1 wherein the additive is selected from compounds of the formulas:

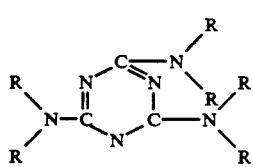

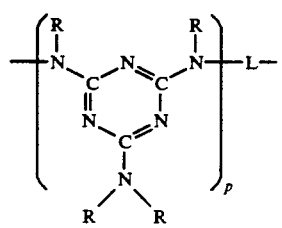

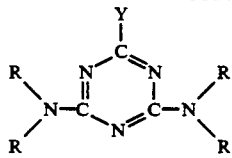

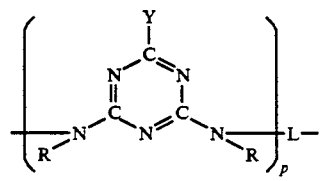

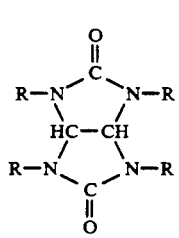

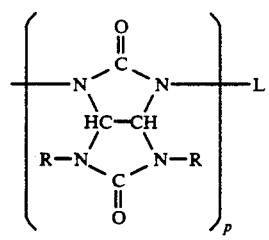

and positional isomers thereof, wherein, in each monomer and in each polymerized unit of the oligomers, Y is selected from methyl, phenyl and cyclohexyl, and, on average,
at least two R are —$CH_2$—$R^1$
and any remaining R are H
at least 2 $R^1$ are radicals selected from

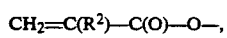

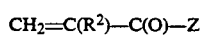

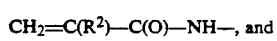

wherein $R^2$ is hydrogen or $C_1$-$C_{18}$ alkyl, and Z is a radical selected from

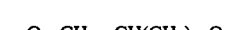

—O—CH(C₂H₅)—O—, and any remaining R¹ radicals are selected from

—O—R³,

—NH—C(O)—OR⁴, and

—NH—C(O)—R⁴ wherein R₃ is hydrogen or R₄, and
R₄ is a C₁-C₁₈ alkyl, alicyclic, hydroxyalkyl, alkoxyalkyl or aromatic radical, and in the oligomers,
P is 2 to about 10,
L is methylene or the radical

—CH₂—O—CH₂—.

4. A vulcanizable rubber composition defined by claim 3 wherein on average at least one R¹ in each monomer or in each oligomerized unit is

—NH—C(O)—OR⁴ wherein R⁴ is as defined in claim 3.

5. A vulcanizable rubber composition defined by claim 3 wherein the defined additive is a compound of the formula

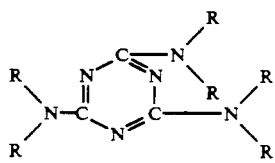

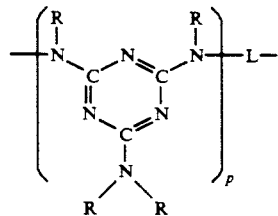

wherein P, L and R are as defined in claim 3.

6. A vulcanizable rubber composition defined by claim 5 wherein, in the formulas, on average at least one rubber in each monomer or in each oligomerized unit is

—CH₂—NH—C(O)—OR⁴ wherein R⁴ is a C₁-C₁₈ alkyl, alicyclic, hydroxyalkyl, alkoxyalkyl or aromatic radical.

7. A vulcanizable rubber composition defined by claim 5 wherein on average at least two R radicals are selected from

CH₂=C(CH₃)—C(O)O—C₃H₆—O—CH₂— and

CH₂=CH₂—C(O)O—C₂H₄—O—CH₂— and at least one R radical is selected from

—CH₂—NH—C(O)—O—CH₃, and

—CH₂—NH—C(O)—O—C₃H₇.

8. A vulcanizable rubber composition defined by claim 5 wherein on average at least two R radicals are selected from

CH₂=CH—C(O)—NH—CH₂—.

9. A vulcanizable rubber composition defined by claim 8 wherein on average at least one additional R radical is selected from —CH₂—NH—C(O)—O—CH₃, and —CH₂—NH—C(O)—O—C₃H₇, and

—CH₂—NH—C(O)—O—C₈H₁₇.

10. A vulcanizable rubber composition defined by claim 3 wherein the defined additive is a compound of the formula

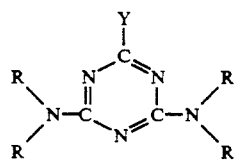

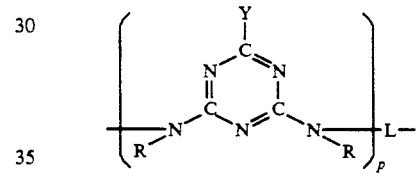

wherein Y is phenyl, and P, L and R are as defined in claim 3.

11. A vulcanizable rubber composition defined by claim 10 wherein on average at least two R radicals are selected from

CH₂=CH—C(O)O—C₂H₄—O—CH₂—

CH₂=CH—C(O)O—CH—₂, and and at least one R radical is selected from

—CH₂—NH—C(O)—O—CH₃.

12. A vulcanizable rubber composition defined by any one of claims 1-4 and further comprising an additional additive selected from hydroxymethylated and alkoxymethylated (alkoxy having 1-5 carbon atoms) derivatives of melamine, acetoguanamine, benzoguanamine, cyclohexylguanamine and glycoluril and their oligomers.

13. The composition of claim 1 wherein the additive is a derivative of melamine or an oligomer of melamine.

14. The composition of claim 1 wherein the additive is a derivative of acetoguanamine or an oligomer of acetoguanamine.

15. The composition of claim 1 wherein the additive is a derivative of benzoguanamine or an oligomer of benzoguanamine.

16. The composition of claim 1 wherein the additive is a derivative of cyclohexylguanamine or an oligomer of cyclohexylguanamine.

17. The composition of claim 1 wherein the additive is a derivative of glycoluril or an oligomer of glycoluril.

18. The composition of claim 1 containing a metal compound.

19. The composition of claim 18 wherein the metal compound is selected from group consisting of zinc oxide, cobalt salt, and mixtures thereof.

20. The composition of claim 19 wherein the metal compound is a cobalt salt.

21. The composition of claim 3 containing a cobalt salt.

22. A composition for making rubber products without reinforcing cords or fabrics and having improved tear strength, said composition comprising the vulcanizable rubber composition of claim 2 together with a metal compound.

23. The composition of claim 22 wherein the metal compound is a cobalt compound.

24. A vulcanizable rubber composition comprising uncured rubber, a vulcanizing agent and at least one additive selected from the group consisting of derivatives of melamine, acetoguanamine, benzoguanamine, cyclohexylguanamine and glycoluril monomers and oligomers of these monomers, which has been substituted on average at two or more positions on the monomer or on each unit of the oligomer with vinyl terminated radicals, and which has been substituted on average at one or more positions with a radical which comprises a carbamylmethyl or an amidomethyl.

25. A vulcanizable rubber composition defined by claim 24 wherein the composition is free of resorcinol.

26. A vulcanizable rubber composition defined by claim 24 wherein the additive is selected from compounds of the formulas:

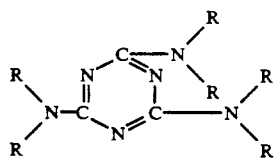

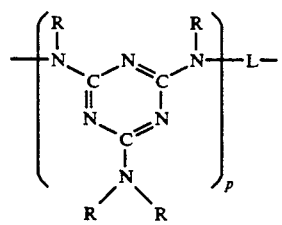

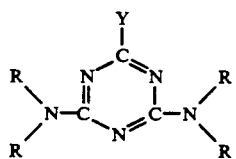

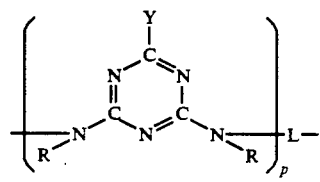

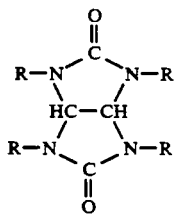

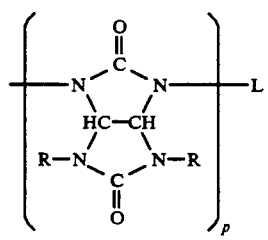

and positional isomers thereof,
wherein in each monomer and in each polymerized unit of the oligomers, Y is selected from methyl, phenyl and cyclohexyl, and, on average,
at least two R are —$CH_2$—$R^1$
and any remaining R are H
at least 2 $R^1$ are radicals selected from $CH^2$=$C(R^2)$—C(O)—O—, $CH^2$=$C(R^2)$—C(O)—Z, $CH^2$=$C(R^2)$—C(O)—NH—, and $CH^2$=$C(R^2)$—C($H_2$)—O—, wherein $R^2$ is hydrogen or $C_1$-$C_{18}$ alkyl, and Z is a radical selected from

—O—$CH_2$—$CH_2$—O—,

—O—$CH_2$—$CH_1(CH_3)$—O—,

—O—$CH_2$—$CH_2$—$CH_2$—O—,

—O—$CH(C_2H_5)$—O—, and any remaining $R^1$ radicals are selected from

—O—$R^3$,

—NH—C(O)—$OR^4$, and

—NH—C(O)—$R^4$ wherein $R^3$ is hydrogen or $R^4$, and
$R^4$ is a $C_1$-$C_{18}$ alkyl, alicyclic, hydroxyalkyl, alkoxyalkyl or aromatic radical, and in the oligomers,
P is 2 to about 10,
L is methylene or the radical

—$CH_2$—O—$CH_2$—.

27. A vulcanizable rubber composition defined by claim 26 wherein on average at least one $R^1$ in each monomer or in each oligomerized unit is

—NH—C(O)—$OR^4$ wherein R⁴ is as defined in claim 26.

28. A vulcanizable rubber composition defined by claim 26 wherein the defined additive is a compound of the formula

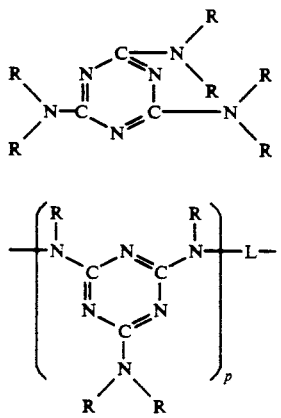

wherein P, L and R are as defined in claim 26.

29. A vulcanizable rubber composition defined by claim 28 wherein, in the formulas, on average at least one R in each monomer or in each oligomerized unit is

—CH₂—NH—C(O)—OR⁴ wherein R⁴ is a C₁-C₁₈ alkyl, alicyclic, hydroxyalkyl, alkoxyalkyl or aromatic radical.

30. A vulcanizable rubber composition defined by claim 28 wherein on average at least two R radicals are selected from

CH₂=C(CH₃)—C(O)O—C₃H₆—O—CH₂— and

CH₂=CH₂—C(O)O—C₂H₄—O—CH₂— and at least one R radical is selected from

—CH₂—NH—C(O)—O—CH₃, and

—CH₂—NH—C(O)—O—C₃H₇.

31. A vulcanizable rubber composition defined by claim 28 wherein on average at least two R radicals are selected from

—CH₂=CH—C(O)—NH—CH₂—.

32. A vulcanizable rubber composition defined by claim 31 wherein on average at least one additional R radical is selected from —CH₂—NH—C(O)—O—CH₃, and —CH₂—NH—C(O)—O—C₃H₇, and

—CH₂—NH—C(O)—O—C₈H₁₇.

33. A vulcanizable rubber composition defined by claim 26 wherein the defined additive is a compound of the formula

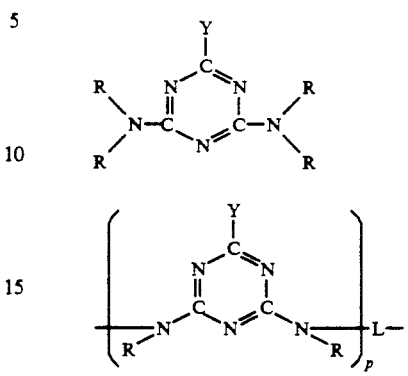

wherein Y is phenyl, and P, L and R are as defined in claim 26.

34. A vulcanizable rubber composition defined by claim 33 wherein on average at least two R radicals are selected from

CH₂=CH—C(O)O—C₂H₄—O—CH₂—

CH₂=CH—C(O)O—CH—₂, and at least one R radical is selected from

—CH₂—NH—C(O)—O—CH₃.

35. A vulcanizable rubber composition defined by claim 24 and further comprising an additional additive selected from the group consisting of hydroxymethylated and alkoxymethylated (alkoxy having 1-5 carbon atoms) derivatives of melamine, acetoguanamine, benzoguanamine, cyclohexylguanamine and glycoluril and their oligomers.

36. A vulcanizable rubber composition defined by claim 24 wherein the additive is a derivative of melamine or an oligomer of melamine.

37. A vulcanizable rubber composition defined by claim 24 wherein the additive is a derivative of acetoguanamine or an oligomer of acetoguanamine.

38. A vulcanizable rubber composition defined by claim 24 wherein the additive is a derivative of benzoguanamine or an oligomer of benzoguanamine.

39. A vulcanizable rubber composition defined by claim 24 wherein the additive is a derivative of cyclohexylguanamine or an oligomer of cyclohexylguanamine.

40. A vulcanizable rubber composition defined by claim 24 wherein the additive is a derivative of glycoluril or an oligomer of glycoluril.

41. A vulcanizable rubber composition defined by claim 24 further containing a metal compound.

42. A vulcanizable rubber composition defined by claim 41 wherein the metal compound is selected from the group consisting of zinc oxide, a cobalt salt and mixtures thereof.

43. A vulcanizable rubber composition defined by claim 42 wherein the metal compound is a cobalt salt.

* * * * *